Feb. 17, 1959  A. A. BRANT ET AL  2,874,348
ELECTROMAGNETIC METHOD OF GEOPHYSICAL EXPLORATION
Filed Oct. 4, 1954  4 Sheets-Sheet 1

ARTHUR A. BRANT and
ALLAN W. LOVE
INVENTORS

BY
ATTORNEY

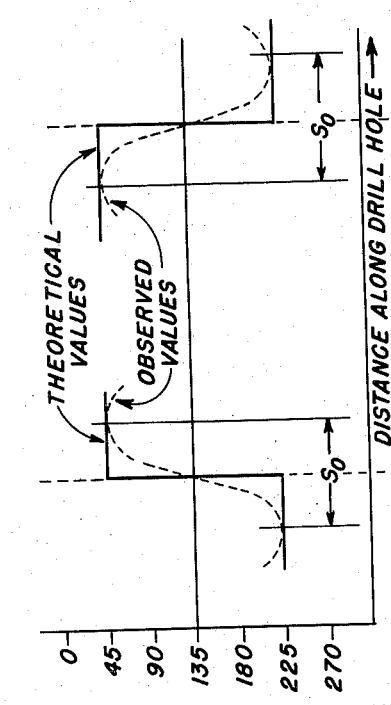
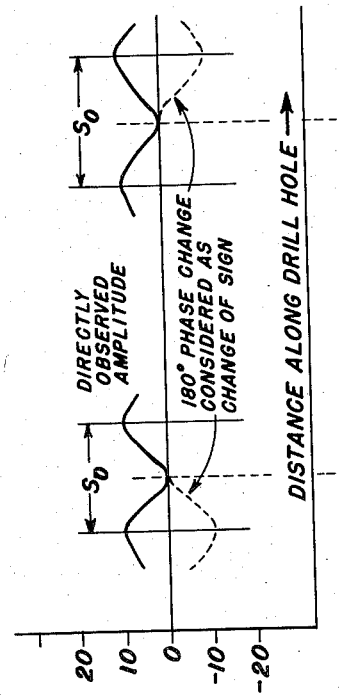
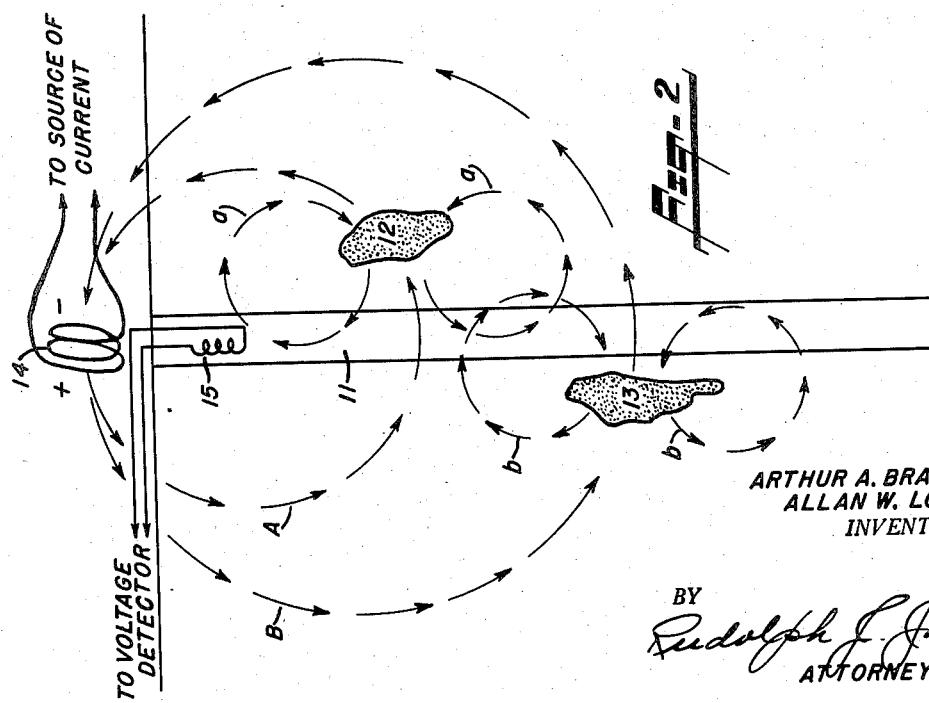
ARTHUR A. BRANT and
ALLAN W. LOVE
INVENTORS

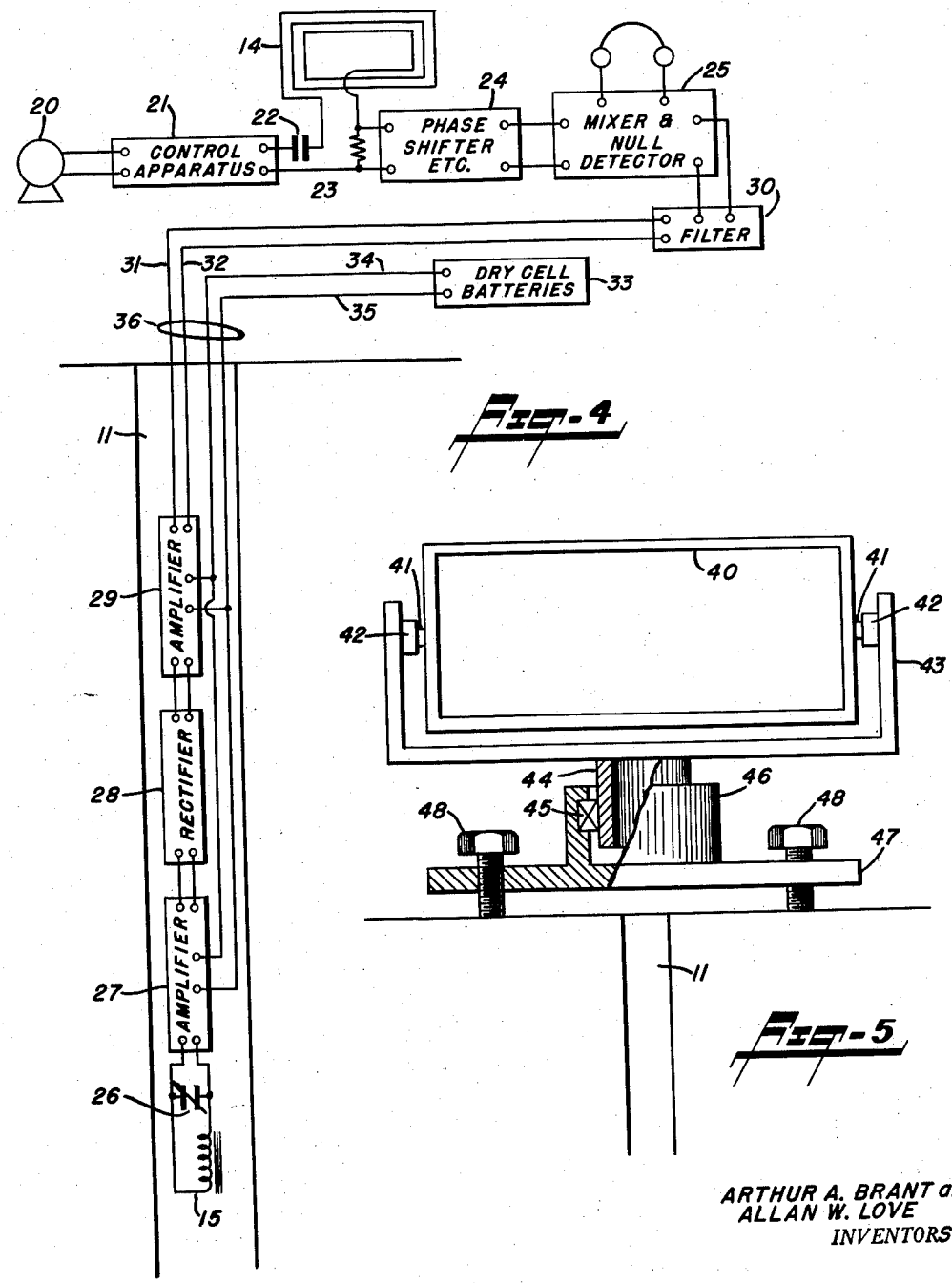

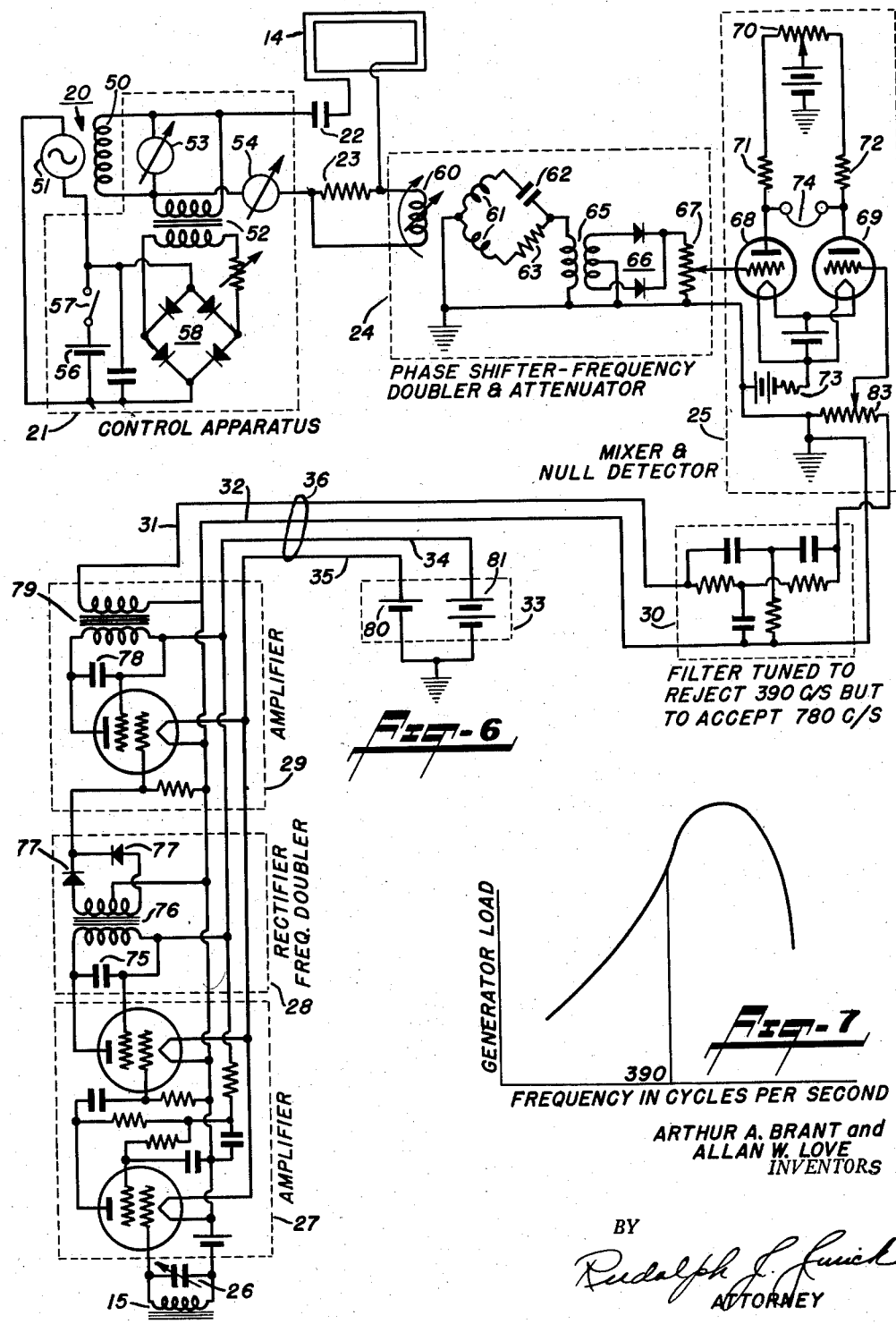

United States Patent Office 2,874,348
Patented Feb. 17, 1959

2,874,348

ELECTROMAGNETIC METHOD OF GEOPHYSICAL EXPLORATION

Arthur A. Brant and Allan W. Love, Clarkdale, Ariz., assignors to Newmont Mining Corporation, New York, N. Y., a corporation of Delaware Application October 4, 1954, Serial No. 460,031

9 Claims. (Cl. 324—6)

This invention relates to apparatus and method for use in geophysical explorations and more particularly to a low frequency electromagnetic induction method for detecting a hidden, massive sulphide ore body and for determining the approximate size of such ore body as well as its azimuthal location relative to a drill hole.

While we shall describe our invention as devised specifically for use in a drill hole it will be quite apparent that the method and associated apparatus herein-disclosed are adapted also for surface use.

In exploration work associated with mining the drill holes are of small diameter, as small as 1.45", are arbitrarily inclined relative to horizontal and, generally, are 2,000 feet or less in length. The small size of the drill holes and their inclination (compared, for example, to the 6" to 8" diameter vertical drill holes common in oil exploration) make it impossible to use apparatus and techniques of the oil exploration art for mining explorations. Additionally, in mining explorations the problem is not to merely detect or recognize the intersected earth-rock formations but to detect massive sulphide pods hidden within the intersected rock and not cut by the drill hole core.

In mining work visual cores provide knowledge of intersected earth formations and the method utilized in further exploratory work must be such as to minimize the effect of the wall formations as much as possible in order that the response from remote, laterally-positioned sulphide occurrences may be detected. Consequently, the aim in mining explorations is to penetrate and explore as far into the rock formation as possible by means of methods and apparatus providing positive diagnostic attributes so that the results may be relied upon.

Since the conductivity of massive sulphide occurrences averages around 10 mhos per meter, which is considerably higher than barren rock formations, relatively low frequency exploratory electromagnetic fields may be used; such low frequency fields not giving rise to variable responses with type of rock formation.

In mining drill hole exploration the scope of the method employed should be such as to provide the following information:

(1) The detection of the presence of a massive sulphide body that is hidden from view;

(2) A basis by which a reasonable estimate can be obtained of the size of the sulphide body; and (3) The ascertainment of the azimuthal location of the body relative to a drill hole.

The invention herein disclosed will provide such information.

Most electro-magnetic methods of geophysical exploration have in common the use of an alternating current in a primary or transmitter coil of several wire turns thereby providing a primary magnetic flux field over a considerable volume of ground. A secondary or detector coil that is movable from point to point is employed to detect the presence of a hidden conducting body through the voltage induced therein by reason of the eddy currents induced in the conducting body by the primary magnetic field. General practice is to orient the detector coil so that the primary field induces no direct voltage therein.

The present invention is based upon the use of an alternating current flow in the primary coil, the frequency of this current being relatively low, of the order of 100 cycles per second, so that any voltage induced in the detector coil will be due solely to the presence of massive or interconnected sulphides and not due to presence of a better conducting section of the rock formation. This is the basis for detecting the presence of the hidden body.

The phase angle of the detected secondary voltage is dependent upon the frequency of the primary current, the conductivity of the sulphide body and the size of such body. The frequency of the primary current is known as is also the average conductivity of massive or interconnected sulphide. These known values afford a basis for the determination of the size of the hidden sulphide body. Specifically, the size of the body is directly readable from the phase angle of the induced secondary voltage relative to the primary current.

It will be shown hereinbelow that the direction of the secondary field resulting from the eddy currents flowing in the conducting body is in one direction when the body lies to one side of the drill hole and of opposite direction when the body lies to the other side of the drill hole. This results in different signs for the phase angle of the detected voltage and such difference provides the basis for establishing the azimuth of the body relative to the drill hole.

An object of this invention is the provision of apparatus and method for use in geophysical exploration particularly with respect to the determination of the presence, size and location of a hidden sulphide body.

An object of this invention is the provision of a method for determining the presence, size and azimuth location of a hidden sulphide body relative to a drill hole said method comprising passing through the ground an alternating magnetic flux in the range of 10–400 cycles per second, and detecting the resultant voltage induced in a detector coil that is movable along the drill hole, the existence of a voltage in the detector coil being indicative of the presence of a sulphide body within the field of influence of the magnetic field, the magnitude of the phase angle of the detected voltage being indicative of the size of the sulphide body, and the sign of the stated phase angle being indicative of the azimuthal position of the body.

An object of this invention is the provision of a method for establishing the size of a hidden conducting body located in the vicinity of a drill hole said method comprising impressing an alternating magnetic flux field through the body, detecting the resultant voltage appearing across a pick-up coil disposed within the drill hole, and moving the pick-up coil along the drill hole, the size of the body being determined from the frequency of the flux field, the known average conductivity of bodies of a character similar to the hidden body and the phase angle of the resultant voltage relative to the flux field.

An object of this invention is the establishment of the azimuth location of a hidden conducting body relative to a drill hole, said method comprising impressing an alternating magnetic flux field through the body, and determining the phase angle relative to the flux field of the resultant voltage developed in a pick-up coil disposed within the drill hole, the sign of the phase angle of the resultant voltage being taken as indicative of the azimuthal location of the body.

These and other objects and advantages of the invention will become apparent from the following detailed description when taken with the accompanying drawings. It will be understood the drawings are for purposes of illustration and are not to be construed as defining the scope or limits of the invention, reference being had for the latter purpose to the claims appended hereto.

In the drawings wherein like reference characters denote like parts in the several views:

Figure 2 is a longitudinal section containing a drill hole and showing the fields generated by the primary coil and the eddy currents flowing in hidden sulphide bodies;

Figure 3A is curves showing the phase angle of the secondary field as the detector coil is moved downwardly along the drill hole;

Figure 3B is similar curves showing the amplitude of secondary field;

Figure 4 is a block diagram of apparatus for practicing our invention in the field;

Figure 5 illustrates the mounting arrangement of the primary coil to facilitate a desired orientation of the coil with respect to the drill hole and the detector coil;

Figure 6 is a circuit diagram of the complete apparatus; and

Figure 7 is a curve showing the relation between load and frequency of the generator used to provide current for the primary field.

Figure 1:
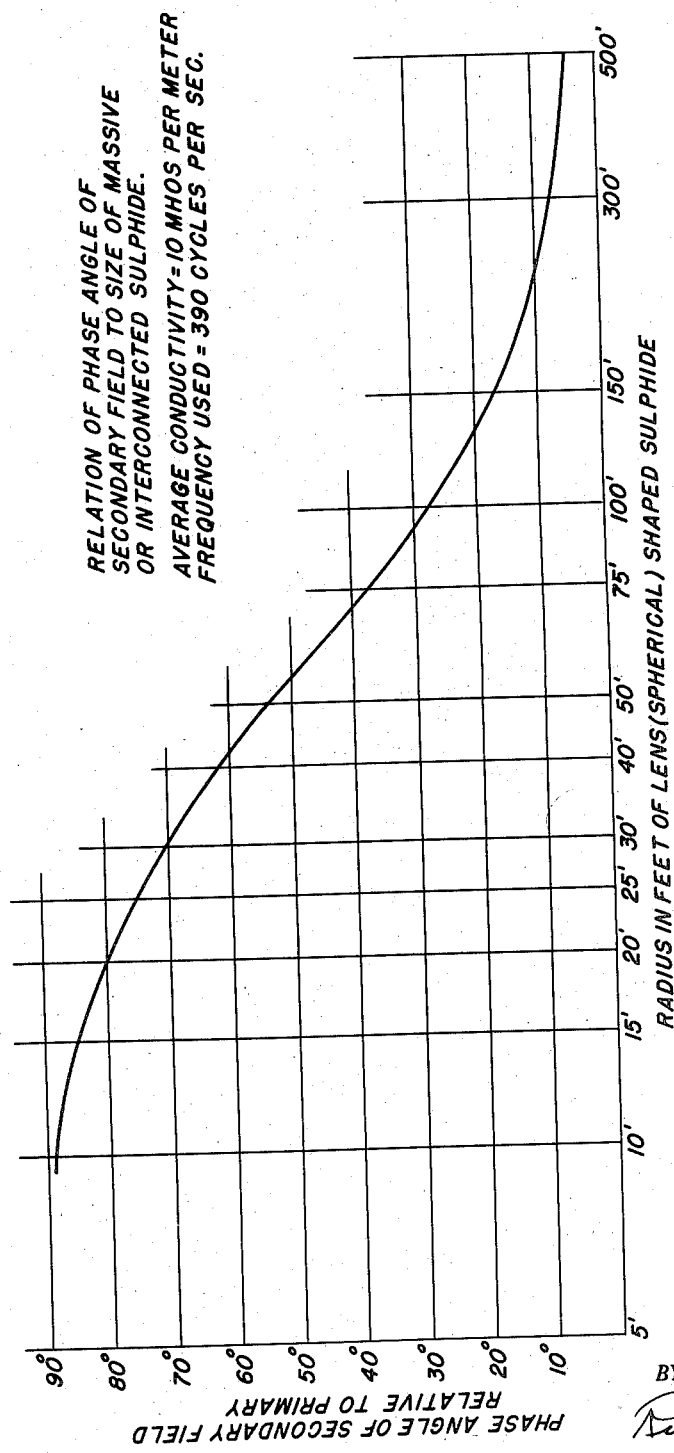
Figure 1 is a curve showing the relation of the phase angle of the detected voltage to the size of a massive or interconnected sulphide body.

Reference is first made to Figure 1 which shows the direct relation between the phase angle of the secondary field due to a massive conducting sulphide body and the size of such sulphide body. An average conductivity for sulphides is taken and a general lens or pod-like shape of occurrence has been assumed. Also, in this particular case the frequency of the primary current was fixed at 390 cycles per second. For this frequency the determination will be sensitive to body sizes of 20–150 feet radius which is fairly representative of the range of sulphide occurrences actually encountered in the field. From this curve it is apparent that the phase angle provides a direct indication of the size of the sulphide body. Consequently, apparatus used for determining the phase angle can be directly calibrated in dimensional factors to provide a direct indication or measurement of the body size.

Figure 2 illustrates the method for determining the azimuthal location of the sulphide body relative to a drill hole. The figure is taken as a longitudinal section containing the drill hole 11 and there are shown two sulphide bodies 12, 13 to either side of the drill hole. A rectangular primary coil 14, of 1–50 turns and having dimensions of approximately 6 feet by 4 feet, is disposed at the mouth of the drill hole, the coil being positioned to contain the axis of the drill hole and to lie perpendicular to the plane of the paper. The axis of the coil perpendciular to the coil is, thus, in the plane of the paper at the same time perpendicular to the axis of the hole. The detector, or pick-up, coil 15 is about 1¼ inches in diameter by 4 feet long so that it can be moved freely along a drill hole of 1.45 inch diameter. The axis of the pick-up coil coincides with the axis of the drill hole and its windings (5,000–10,000 turns) wound on a ferrite core rod whose axis coincides with that of the drill hole. Thus, the windings of the pick-up coil are in a plane at right angles to the windings of the primary coil. Hence, there will be no direct pick-up by the coil 15 of the primary field generated by the coil 14. Further, the relatively low frequency of the current flowing in the primary coil (390 cycles per second or less) assures that no secondary fields arise from barren rock bodies of a wide range of conductivity. While we prefer to use a rectangular primary coil such coil may be of circular shape about 4-6 feet in diameter or overall size, of 1–50 turns of wire, and only a few inches in actual thickness.

The primary magnetic lines of force, or flux, due to the current flowing in the coil 14, are indicated by the circles A, B with their momentary directive sense indicated by the arrows. This primary flux field induces eddy currents (not shown) in the sulphide bodies 12, 13 which eddy currents, in turn, give rise to secondary magnetic flux fields opposing the primary field. Such secondary magnetic flux fields are indicated by the circles $a, a,$ and $b, b,$ for the bodies 12, 13 respectively and their momentary directive sense is as indicated by the arrows. However, the secondary flux fields, due to the massive sulphide, do not precisely oppose the primary fields since they normally lead the primary field by about 45 degrees on the average.

Now, if we consider the positive reference direction of the secondary fields as down the drill hole, then the phase angles of the detected secondary fields as the pick-up coil 15 is moved down the drill hole are as shown in Figure 3A. Comparing the phase angles at points opposite the sulphide bodies 12 and 13 it will be clear that the value of the phase angle gives a direct indication of the location of the bodies relative to the plane of the pick-up coil. Specifically, as the pick-up coil is moved downwardly along the drill hole, the phase angle of the voltage induced in the pick-up coil relative to the primary coil voltage changes from a relatively high value to a relatively low value as the pick-up coil moves past the center of the body 12. Similarly, the stated phase angle changes from a relatively low value to a relatively high value as the pick-up coil moves past the center of the body 13. This directional and magnitude change in the phase angle provides a distinct orientation of the hidden sulphide body relative to the position of the primary coil 14. If the sides of the primary coil are designated (+) and (−) with reference to the momentary direction of the resulting magnetic flux lines (as shown in Figure 2) the location of the sulphide body with respect to the plane of such coil is apparent. The simple rule, then, for establishing the azimuth position of the body is as follows: if the phase angle of the secondary voltage changes from greater than 90° to less than 90° the sulphide body lies to the negative face of the primary coil, or on the negative side of the primary coil; if the phase angle changes from less than 90° to greater than 90° the body is on the positive side of the primary coil plane. It will be noted also that the respective maximum rates of change of the phase, with distance, are also negative and positive, respectively.

If we now place the primary coil at the mouth of the drill hole in the plane of the section shown in Figure 2, rather than perpendicular thereto as in the first instance and repeat the procedure of obtaining the phase angle of the pick-up voltage, as before, we can readily determine the positional quadrant for the sulphide bodies.

It may here be pointed out that the positive face or side of the primary coil may readily be determined after all the connections are made. Referring to Figure 2 where the primary coil is disposed in a plane perpendicular to the plane of the section i. e. the paper, simply keep the primary coil plane perpendicular to the section and merely turn the coil end nearest the pick-up coil toward the supposed negative face side. A positive signal that is, a signal with a zero phase angle should then result in the pick-up coil. If the turn had actually been made toward the positive coil side a negative signal, that is, one with 180° phase angle would have been noted in the pick-up coil.

For completeness, Figure 3B shows the amplitudes of the secondary fields as the pick-up coil is moved down the drill hole past the sulphide bodies. The amplitudes in themselves evidence the presence of massive or interconnected sulphides but give no clue to their azimuthal position unless the 180° change of phase on passing opposite the body is noted. Then, as shown, a change of amplitude from negative to positive evidences a body on the negative side of the primary coil while a change of amplitude from positive to negative shows the body to be on the positive side of the primary coil plane.

The distance $S_o$, shown in Figures 3A and 3B is the distance between maximum and minimum points on the phase angle and amplitude curves. This distance gives evidence of the distance to the sulphide body from the drill hole. Thus, $S_o$ is a measure of the distance to the center of the body.

We have now shown how a phase angle measurement of the secondary field may be used to indicate the azimuthal location of a hidden sulphide body and how a phase measurement alone or in combination with an amplitude measurement may be used to determine the size of the body.

The mere presence of a sulphide body is simply apparent from the mere presence of a phase angle between the detected and primary voltages if the frequency of the current in the primary coil is sufficiently low. With a higher frequency primary current the stated phase angle will tend towards a zero value and mere amplitude signals will result; the same as, for example, would result from a bending of the drill hole carrying the pick-up coil out of the plane of the primary coil. Thus, the amplitude alone of the secondary voltage is not a sufficient and reliable criterion to establish the presence of sulphides. Also, if the frequency of the primary current is too high, say 1000 cycles and up, phase angle displacements occur with large barren rock masses of higher than average conductivity. The necessary criterion, then, for detection purposes is a phase angle measurement at a relatively low primary current frequency.

Having now shown the basis and working principles of our method we proceed to a description of the associated apparatus that is used to measure the phase angle, between 0 and 360, as well as the amplitude of the detected voltage.

Figure 4 is a block diagram of the apparatus. The current source comprises a gasoline motor driven generator 20 and associated control apparatus 21, the latter controlling and regulating the frequency of the generator output and serving to initially excite the generator field windings. The primary coil 14 is connected to the control apparatus through the tuning condenser 22 and the fixed resistor 23. It may here be stated that the generator is capable of delivering a current of 12 amperes to the primary coil which coil may be about 25 feet square in area with about 50 turns. To facilitate the practice of the invention in the field the primary coil may be suspended from a universal head or be supported on a cylindrical bearing arrangement as will be described in more detail hereinbelow. The voltage drop across the resistor 23 is fed to a phase shifter 24, which also incorporates a frequency doubler and attenuator, and the output of the phase shifter is fed to a suitable null detector 25. Within the drill hole is the pick-up coil 15 (preferably of the ferrite core type) shunted by the tuning condenser 26. The coil terminals are connected to the input terminals of a two stage amplifier 27 that feeds a full wave rectifier 28 acting as a frequency doubler. The rectified output of the rectifier 28 is fed to a single stage amplifier 29 including a tuned output transformer having a low impedance secondary. A set of dry cell batteries for energizing the amplifiers 27 and 29 are housed above ground in a container 33 and are connected to the amplifiers through the cables 34, 35. Within the drill hole the connecting cables 31, 32, 34, 35 are incorporated in a 4-conductor shielded cable 36. The signal voltage induced in the pick-up coil 15 is fed to the filter 30, through the leads 31, 32, and then to the null detector 25.

Before passing to a detailed description of the circuitry reference is made to Figure 5 which is a more or less diagrammatic representation showing the mounting arrangement of the primary coil 14. The coil is wound upon a rectangular frame 40 having alined shafts 41 journaled for rotation in cooperating bearings 42 carried by a U-shaped metal frame 43. Centrally secured to the frame 43 is a cylinder 44 which fits into a cylindrical bearing 45 secured within the cylindrical column 46. The column 46 is secured to a heavy base plate 47 provided with leveling bolts 48. The coil winding generally comprises about 50 turns of insulated copper cable carrying 10–12 amperes. It will be apparent that the coil frame 40 can be rotated in a substantially horizontal plane about the axis of the shafts 41 and in a substantially vertical plane about the bearing 45. Consequently, the primary coil can be positioned in any desired orientation with respect to the axis or plane of the drill hole 11 for the purpose of obtaining selected readings of the voltage induced in the pick-up coil disposed within the drill hole.

Reference is now made to Figure 6 which is a circuit diagram of the complete apparatus utilized in the practice of our invention, the components shown in the block diagram of Figure 4 being shown within the dotted line areas of Figure 6 and identified accordingly. The generator 20 includes a stator 50 and a rotating field 51. With a decreasing load on the generator the voltage across the transformer 52 increases thereby increasing the voltage across the field 51 causing the generator to speed up. This results in an increase in the generator frequency and output and the increased current drawn from the generator causes it to slow down. In actual practice we operate the generator on the steep part of its output curve as shown in Figure 7. The frequency and load both oscillate about the 390 cycle operating point. If the primary coil 14 is tuned by the series condenser 22 slightly above the operating frequency, say by about 8 cycles per second, then operation is relatively stable and the frequency varies back and forth over a range of two (2) cycles. The frequency of the current supplied to the primary coil is indicated by a frequency meter 53 and the current magnitude by the ammeter 54. The generator initially is excited by a 45 volt battery 56 upon momentary closure of the switch 57, as is standard practice in this art. At normal operating speed the generator output voltage is approximately 110 volts and this voltage is reduced to approximately 18 volts by the transformer 52. This reduced voltage is applied across the input terminals of the rectifier 58 which provides the D.-C. voltage across the stator 50.

The voltage drop appearing across the series resistor 23 is impressed upon the phase-shifter 24. Such phase-shifter may comprise a two-phase teletorque motor, of the class known as Selsyn, Autosyn, etc., and includes a rotor 60 and a pair of stators 61 disposed at a right angle to each other. The rotor 60 is arranged for manual rotation throughout 360 angular degrees by means of an external, calibrated dial. There is a linear phase shift versus rotor angle with constant amplitude, provided $\omega RC = 1$ where:

$\omega = 2\pi f$.
$f$ = the frequency of the generator,
$C$ = the capacity of the bridge condenser 62, in farads, and
$R$ = the resistance of the bridge resistor 63, in ohms.

The transformer 65, having a high impedance primary winding in the region of 0.1 megohm is energized by the current output of the phase-shifter bridge. This system, then, permits a ready adjustment between 0 and 360 degrees, of the phase of the voltage drop across the resistor 23 without change in voltage amplitude. The voltage drop across the resistor 23 is in phase with the primary current flowing through the primary coil 14 and the primary magnetic field and hence serves as a reference for subsequent measurements to be made.

The secondary winding of the transformer 65 is connected across the full wave, germanium diode rectifier 66 which acts as a frequency doubler and the rectified output voltage apears across the rheostat 67 having a total value of about 1 megohm. Thus, the voltage drop across the rheostat 67 is adjusted for any desired phase relation by the teletorque motor and is fractionated to any desired amplitude by the rheostat before being applied to the mixer and null detector 25.

The mixer and null detector 25 essentially is a differential amplifier including a pair of vacuum tubes 68, 69, tube ballast resistor 70, plate load resistors 71, 72 and a cathode resistor 73, the latter having a substantially higher resistance than either of the plate load resistors. The ballast resistor 70 reduces voltage fluctuations on the plates of the tubes 68 and 69 since the voltage drop across such resistor varies with the voltage of the attached plate batteries. Any output difference in the anode circuits of the tubes results in a signal detected by the high impedance crystal headphones 74.

The apparatus adapted for movement along the drill hole comprises the pick-up coil 15, wound on a ferrite core, the amplifiers 27, 29 and the frequency doubler 28. The amplifiers and frequency doubler are of conventional design obviating the need for a detailed description thereof.

The down-hole components; namely, the pick-up coil 15, amplifiers 27, 29 and frequency doubler 28, are housed within a plastic tube about 8 feet long and 1.375 inches in diameter. Actually, the pick-up coil 15 consists of some six sections connected in series, each being a ferrite core on which are several thousand turns of fine copper wire wound so that the turns are in planes perpendicular to the long axis. The pick-up coil is tuned to 390 cycles by the condenser 26 and the voltage induced in the coil is amplified by a conventional, two stage, resistance coupled amplifier 27. The output of this amplifier is fed to the frequency doubler 28 which consists of the transformer 76, having its primary winding tuned to 390 cycles by the condenser 75, and the double diodes 77. The frequency doubled voltage output is amplified by the final, single stage amplifier 29 and then applied to the output transformer 79 having its primary winding tuned to 780 cycles by the condenser 78. This transformer has a low impedance secondary to match that of the connecting lines 31, 32 going to the above ground filter 30, the latter being preset to accept 780 and reject 390 cycle signals. Frequency doubling is desirable because of the pick-up of the primary field by the relatively long lines 31, 32. Rejecting the 390 cycle signal by the filter 30 eliminates from the measuring function such spurious signals of the generator frequency.

As previously pointed out, the down-hole components are energized by dry cell batteries, such as the 1.3 volt battery 80 and the 45 volt battery 81 housed in a container 33 and connected to the circuit by means of the lines 34, 35.

The 780 cycle signal passing through the filter 30 is fed to the mixer and null detector 25 across a calibrated attenuator 83. Actually, the attenuator 83 is not essential to the operation of the circuit but it does afford a practical means to meet the wide range of signals picked up by the pick-up coil with varying distances between such coil and the primary coil 14.

The primary voltage across the resistor 23 is in phase with the primary field. However, the voltage component applied to one side of the mixer and null detector 25 is phase adjusted by the phase shifter 24 and amplitude adjusted by the rheostat 67. The detected voltage component is applied to the other side of the mixer and null detector through the calibrated rheostat 83 which normally is set at a convenient fraction. The rheostat 67 and the rotor 60 are adjusted to obtain a null balance as indicated by minimum sound in the headphones 74.

The net result is that the phase of the voltage across the pick-up coil 15, relative to the primary voltage across the resistor 23, is given directly by the setting of the rotor 60 as indicated by a suitably calibrated dial. The amplitude of the voltage induced in the pick-up coil is $$\frac{0.1 I_p r_{67}}{A r_{83}}$$

where, 0.1 = the value of the resistor 23, in ohms,
$I_p$ = the current flowing in the primary coil, in amperes,
$r_{67}$ = the fraction setting of the rheostat 67,
$A$ = the amplification factor of the amplifiers 27, 29 and the frequency doubler 28, and
$r_{83}$ = the fraction setting of the rheostat 83.

Since the factors 0.1, $I_p$ and A are constant, the amplitude of the voltage induced in the pick-up coil is equal to $$C \frac{r_{67}}{r_{83}}$$

where $$C = \frac{0.1 I_p}{A}$$

We have shown that at sufficiently low frequencies the presence of a phase angle in connection with the voltage induced across the pick-up coil is directly indicative of the presence of a massive or interconnected sulphide body. Since the direct measurement of the phase angle of the secondary voltage has been shown to be a direct measurement of the size of the sulphide body at a given primary current frequency, the dial attached to the rotor of the phase shifter 24, Figure 6, can be calibrated, if desired, directly in terms of body size. Also, the variation in phase angle between 0–270 degrees of the secondary field along the drill hole tells unequivocally the azimuthal location of the sulphide body relative to the drill hole. The apparatus described affords a direct measurement of the phase angle of the secondary voltage between 0–360° and we have presented a simple and positive method for relating the phase angle to the detection of a hidden sulphide body, the establishment of its azimuthal position relative to a drill hole and the establishment of its size.

Having described our apparatus and method in detail in accordance with the requirements of the patent statutes, various changes and modifications will suggest themselves to those skilled in this art, and it is intended that such changes and modifications shall fall within the spirit and scope of the invention as recited in the following claims:

We claim:

1. An electromagnetic method of determining the approximate size of a hidden conducting ore body spaced from a drill hole, which method comprises establishing a magnetic field having a frequency in the range of 30–400 cycles per second in a region of ground including the drill hole and measuring the phase angle of the resultant voltages induced in a pick-up coil that is moved along the drill hole, the distance measured along the drill hole between the points at which occur successive maximum and minimum values of the stated phase angle being a measure of the distance from the drill hole to the body.

2. An electromagnetic method of establishing the azimuthal position of a hidden conducting ore body relative to a drill hole, which method comprises placing a primary coil at the mouth of the drill hole said coil being relatively thin in axial width and having its axis normal to that of the drill hole, passing a current having a frequency in the range of 30–400 cycles per second through the primary coil, and measuring the phase angle of the resultant voltages induced in a pick-up coil that is moved along the drill hole said pick-up coil having its axis parallel to that of the drill hole, a change in the magnitude of the stated phase angle from greater than 90° to less than 90° being indicative of the fact that the body lies to one side of the plane of the primary coil and a phase angle change from less than 90° to more than 90° being indicative of the fact that the body lies to the opposite side of the plane of the primary coil.

3. An electromagnetic method of establishing the presence of a hidden conducting ore body spaced from a drill hole, which method comprises placing a primary coil at the mouth of the drill hole, said primary coil being relatively thin in axial width and lying in a plane containing the drill hole axis; moving a pick-up coil along the drill hole, said pick-up coil having its axis parallel to the axis of the drill hole and normal to the axis of the primary coil; impressing a current having a frequency of 30–400 cycles per second through the primary coil; and measuring the phase angle of the voltage induced in the pick-up coil relative to the primary current as the pick-up coil is moved along the drill hole; the magnitude and sense of the phase angle being taken as indicative of the presence of a conducting ore body in the vicinity of the drill hole.

4. Apparatus for use in making geophysical explorations along a drill hole said apparatus comprising a primary coil adapted to be placed at the mouth of the drill hole; means to selectively orient the axis of primary coil with respect to the axis of the drill hole; a source of alternating current having a frequency variable in the range of 30–400 cycles per second and connected to the primary coil; a first resistor connected in series with the primary coil and the source of current; a manually-adjustable phase shifter energized by the voltage drop across said first resistor; means rectifying the output voltage of the phase shifter and doubling its frequency; a differential amplifier comprising a pair of vacuum tubes each having a control grid; means responsive to an unbalance in the output of the differential amplifier; means including a rheostat to impress a selected fraction of the said rectified voltage upon the grid of one tube of the differential amplifier; a pick-up coil adapted to be inserted into the drill hole and having an axis parallel to that of the drill hole; means amplifying and doubling the frequency of the voltage signal induced in the pick-up coil; and means including a filter network impressing the amplified and frequency doubled voltage of the pick-up coil upon the grid of the other tube of the differential amplifier, said filter being tuned to reject the frequency of said source of current.

5. The invention as recited in claim 4 including means tuning the primary coil and the pick-up coil to the frequency of the said source of current.

6. The invention as recited in claim 4 wherein the said manually-adjustable phase shifter includes a movable member that is movable relative to a cooperating scale calibrated directly in terms of the size of a conducting ore body.

7. An electromagnetic method of establishing the azimuthal position of a conducting ore body relative to a drill hole, which method comprises placing a primary coil at the mouth of the drill hole said coil having its axis normal to that of the drill hole, passing an alternating current through the primary coil said current having a frequency in the range of 30–400 cycles per second, and obtaining the resultant voltage induced in a pick-up coil that is moved along the drill hole said pick-up coil having its axis parallel to that of the drill hole, a change in the polarity of the resultant voltage from negative to positive being indicative of the fact that the conducting ore body lies to one side of the plane of the primary coil and a change in such voltage from positive to negative being indicative of the fact that the conducting ore body lies to the other side of the plane of the primary coil, the positive polarity of the resultant voltage being in phase with the magnetic field established by the current flowing in the primary coil.

8. A method of establishing the approximate size of a hidden conducting ore body spaced from a drill hole, which method comprises the steps of claim 2 and measuring the distance along the drill hole between the points at which occur successive maximum and minimum values of the stated phase angle, the stated distance along the drill hole between the points at which occur successive maximum and minimum values of the stated phase angle being taken as a measure of the distance from the drill hole to the body.

9. A method of establishing the approximate size of a hidden conducting ore body spaced from a drill hole, which method comprises the steps recited in claim 7 and measuring the distance along the drill hole between points at which occur successive maximum and minimum values of the resultant voltage, the stated distance along the drill hole between points at which occur successive maximum and minimum values of the resultant voltage being taken as a measure of the distance from the drill hole to the body.

References Cited in the file of this patent

UNITED STATES PATENTS

| 1,325,554 | Carlson | Dec. 23, 1919 |
| 1,811,547 | Jakosky | June 23, 1931 |
| 1,820,953 | Sundberg et al. | Sept. 1, 1931 |
| 2,608,602 | Muffly | Aug. 26, 1952 |
| 2,652,530 | Davidson | Sept. 15, 1953 |
| 2,746,009 | McLaughlin et al. | May 15, 1956 |